US011770472B2

(12) United States Patent
Itani et al.

(10) Patent No.: US 11,770,472 B2
(45) Date of Patent: *Sep. 26, 2023

(54) METHOD AND APPARATUS FOR OPT-IN COMPLIANCE WITH REGULATIONS

(71) Applicant: WEST TEXAS TECHNOLOGY PARTNERS, LLC, Waco, TX (US)

(72) Inventors: Sleiman Itani, East Palo Alto, CA (US); Sina Fateh, Mountain View, CA (US)

(73) Assignee: West Texas Technology Partners, LLC

(*) Notice: Subject to any disclaimer, the term of this patent is extended or adjusted under 35 U.S.C. 154(b) by 0 days.

This patent is subject to a terminal disclaimer.

(21) Appl. No.: 17/135,350

(22) Filed: Dec. 28, 2020

(65) Prior Publication Data

US 2021/0120119 A1 Apr. 22, 2021

Related U.S. Application Data

(63) Continuation of application No. 16/825,915, filed on Mar. 20, 2020, now Pat. No. 10,911,591, which is a continuation of application No. 13/903,934, filed on May 28, 2013, now Pat. No. 10,637,984.

(51) Int. Cl.
*H04W 12/00* (2021.01)
*G06F 21/00* (2013.01)
*H04M 1/72463* (2021.01)
*H04W 52/02* (2009.01)

(52) U.S. Cl.
CPC .... *H04M 1/72463* (2021.01); *H04W 52/0245* (2013.01); *Y02D 30/70* (2020.08)

(58) Field of Classification Search
None
See application file for complete search history.

(56) References Cited

U.S. PATENT DOCUMENTS

| | | | |
|---|---|---|---|
| 6,799,052 B2 | 9/2004 | Agness et al. | |
| 7,948,375 B2 | 5/2011 | Goldberg et al. | |
| 8,498,670 B2 | 7/2013 | Cha et al. | |
| 10,911,591 B2* | 2/2021 | Itani | H04W 4/02 |
| 2003/0114169 A1 | 6/2003 | Okamura et al. | |
| 2004/0203667 A1 | 10/2004 | Schroeder et al. | |
| 2010/0259389 A1* | 10/2010 | Marshall | G08B 21/24 340/572.1 |

(Continued)

*Primary Examiner* — Gary Lafontant
(74) *Attorney, Agent, or Firm* — Cadwalader, Wickersham & Taft LLP

(57) ABSTRACT

Disclosed are methods, systems and paradigms for opt-in compliance with regulations. A region in physical space is defined. A condition for the region is defined, the condition being a capability of a communicator such as video recording, still image recording, audio recording, audio output, text messaging, audio communication, or remote connection. The presence and location of a communicator with the capability is detected in the region, and a message is sent to the communicator with a request for a response accepting or rejecting remote deactivation of the capability of the communicator. If an acceptance response is received, the communicator capability is deactivated. If an acceptance response is not received, a notification is generated that includes the lack of acceptance response and the location of the communicator.

19 Claims, 7 Drawing Sheets

(56) References Cited

U.S. PATENT DOCUMENTS

| | | |
|---|---|---|
| 2011/0165861 A1 | 7/2011 | Wilson et al. |
| 2011/0171907 A1 | 7/2011 | Jolivet |
| 2012/0173251 A1 | 7/2012 | Gillin |
| 2013/0165153 A1 | 6/2013 | Turk et al. |
| 2014/0046830 A1 | 2/2014 | Orozco et al. |

* cited by examiner

METHOD AND APPARATUS FOR OPT-IN COMPLIANCE WITH REGULATIONS

CROSS-REFERENCE TO RELATED APPLICATION

This application is a continuation of U.S. patent application Ser. No. 16/825,915, filed Mar. 20, 2020, which is a continuation of U.S. patent application Ser. No. 13/903,934, filed May 28, 2013, now U.S. Pat. No. 10,637,984. The entirety of these references is incorporated herein by reference for all intents and purposes.

TECHNICAL FIELD

The disclosed technique relates to opt-in compliance with regulations, such as prohibitions against certain behaviors. More particularly, the disclosed technique relates to approaches for obtaining opt-in from communication devices and/or users thereof to refrain from certain behaviors and/or to deactivate certain functions the communication devices themselves.

DESCRIPTION OF RELATED ART

Achieving compliance with regulations in particular areas is a longstanding problem. For example, as portable electronic devices become increasingly common, use of certain capabilities of such devices may be prohibited in some areas and circumstances as being inappropriate or even dangerous. Reasons for such regulations vary, but might include potential risks to safe operation of aircraft due to emissions from electronic devices, audible ring tones in restaurants and theaters creating a disturbance for other patrons, video recording of performances or other events violating copyright or privacy laws and/or presenting a nuisance for other attendees, etc.

Effectively achieving compliance with a prohibition against such behaviors, or more generally achieving compliance with other regulations, may be problematic. Simply prohibiting behaviors may prove insufficient to reliably achieve full compliance. Individually verifying compliance may be impractical in at least some situations. Unilaterally deactivating electronic devices and/or rendering them incapable of certain functions, such as by generating interference fields that block cell phone signals, may cause offense to users of the devices, and/or may be legally problematic in certain jurisdictions.

There is a need for an effective method and apparatus for obtaining user opt-in for compliance with prohibition of problematic behaviors, including but not limited to problematic capabilities of devices themselves.

SUMMARY

The disclosed technique contemplates a variety of systems, apparatus, methods, and paradigms for obtaining opt-in to compliance with regulation, including but not limited to opt-in deactivation of prohibited capabilities of electronic and/or communication devices.

In one embodiment of the disclosed technique, a method is provided that includes defining a region, and defining a condition for the region. The method also includes detecting the presence and location of a communicator and the condition in the region and associating the condition with the communicator. A message is sent to the communicator, the message including a request for a response. If a response is received accepting the content of the message, a first action is executed. If a response accepting the content of the message is not received, a second action is executed.

The region may be defined in physical space.

The communicator may be a phone, a personal data assistant, a tablet, a laptop computer, and/or a head mounted display.

The condition may be a capability of the communicator. The capability may be video recording capability, still image recording capability, audio recording capability, audio output capability, text messaging capability, audio communication capability, and/or remote connection capability.

The method may include defining limiting parameters for executing the actor input, executing the actor input within the parameters, and detecting the actor input within the parameters.

The message may include a yes/no option. The message may include a request for permission to deactivate a capability of the communicator.

The first action may include deactivating a capability of the communicator. Deactivating the capability of the communicator may include sending a deactivation instruction to the communicator. The capability may be video recording capability, still image recording capability, audio recording capability, audio output capability, text messaging capability, audio communication capability, and/or remote connection capability.

The second action may include generating a notification noting the lack of a response including acceptance and the location of the communicator. The second action may also include communicating the notification to a recipient. The recipient may include a video display, an audio speaker, and/or a data store.

Detecting the presence of the condition may include querying the communicator for the presence of the condition therein.

The method may include defining first and second regions, and defining the condition for the first and second regions. The method may include detecting the presence and location of the communicator within the first and second regions, and detecting the presence and location of the condition in the first and second regions. When the communicator is in the first region, a first message is sent to the communicator. When the communicator is in the second region, a second message is sent to the communicator, the second message including the request for response. The first action is executed if a response including acceptance of the content of the message is received; a second action is executed if a response including acceptance of the content of the message is not received.

The first message may include an advisory regarding the condition.

The method may include executing a third action when the presence of the communicator is no longer detected in the region. The first action may include deactivating a capability of the communicator, and the third action may include reactivating that capability of the communicator.

In another embodiment of the disclosed technique, an apparatus is provided that includes a processor, a sensor in communication with the processor, and a first communicator in communication with the processor. The processor is adapted to define a region and to define a condition for the region. The sensor is adapted to detect the presence and location of a second communicator in the region, and to detect the presence and location of the condition in the region. The processor is further adapted to associate the condition with the second communicator. The first communicator is adapted to send a message to the second communicator, the message including a request for a response to the message, and to receive the response. The processor is further adapted to execute a first action if an acceptance response to the message is received, and to execute a second action if an acceptance response to the message is not received.

The apparatus may include a recipient in communication with the processor, with the processor being adapted to generate a notification if the acceptance response is not received, and the recipient being adapted to receive the notification from the processor.

In another embodiment of the disclosed technique, an apparatus is provided that includes means for defining a region, means for defining a condition for the region, means for detecting the presence and location of a communicator in the region, means for detecting the presence and location of the condition in the region, means for associating the condition with the communicator, means for sending a message to the communicator with the message including a request for a response to the message, means for receiving the response, means for executing a first action if a response is received including acceptance of the content of the message, and means for executing a second action if a response including acceptance is not received.

In another embodiment of the disclosed technique, a method is provided that includes instantiating in a processor executable instructions for the processor to define a region, instantiating in the processor executable instructions for the processor to define a condition for the region, instantiating in the processor executable instructions for the processor to instruct a sensor in communication with the processor to detect the presence and location of a second communicator in the region, instantiating in the processor executable instructions for the processor to instruct the sensor to detect the presence and location of the condition in the region, instantiating in the processor executable instructions for the processor to associate the condition with the second communicator, instantiating in the processor executable instructions for the processor to instruct a first communicator in communication with the processor to send a message to the second communicator with the message including a request for a response to the message, instantiating in the processor executable instructions for the processor to instruct the first communicator to receive the response, instantiating in the processor executable instructions for the processor to execute a first action if an acceptance response to the message is received, and instantiating in the processor executable instructions for the processor to execute a second action if the acceptance response is not received.

In another embodiment of the disclosed technique, a method is provided that includes storing in a data store executable instructions for a processor to define a region, storing in the data store executable instructions for the processor to define a condition for the region, storing in the data store executable instructions for the processor to instruct a sensor in communication with the processor to detect the presence and location of a second communicator in the region, storing in the data store executable instructions for the processor to instruct the sensor to detect the presence and location of the condition in the region, storing in the data store executable instructions for the processor to associate the condition with the second communicator, storing in the data store executable instructions for the processor to instruct a first communicator in communication with the processor to send a message to the second communicator with the message including a request for a response to the message, storing in the data store executable instructions for the processor to instruct the first communicator to receive the response, storing in the data store executable instructions for the processor to execute a first action if an acceptance response to the message is received, and storing in the data store executable instructions for the processor to execute a second action if the acceptance response is not received.

In another embodiment of the disclosed technique, a method is provided that includes defining a region in physical space. The method also includes defining a condition for the region, the condition including a capability of a communicator, the capability including video recording capability, still image recording capability, audio recording capability, audio output capability, text messaging capability, audio communication capability, and/or remote connection capability. The method further includes detecting the presence and location of the communicator with the condition in the region, and sending a message to the communicator with the message including a request for a response including acceptance or rejection of deactivation of the capability of the communicator. If an acceptance response is received, the capability is deactivated. If an acceptance response is not received, a notification is generated including the lack of the acceptance response and the location of the communicator.

BRIEF DESCRIPTION OF THE SEVERAL VIEWS OF THE DRAWINGS

Like reference numbers generally indicate corresponding elements in the figures.

DETAILED DESCRIPTION

Figure 1A:
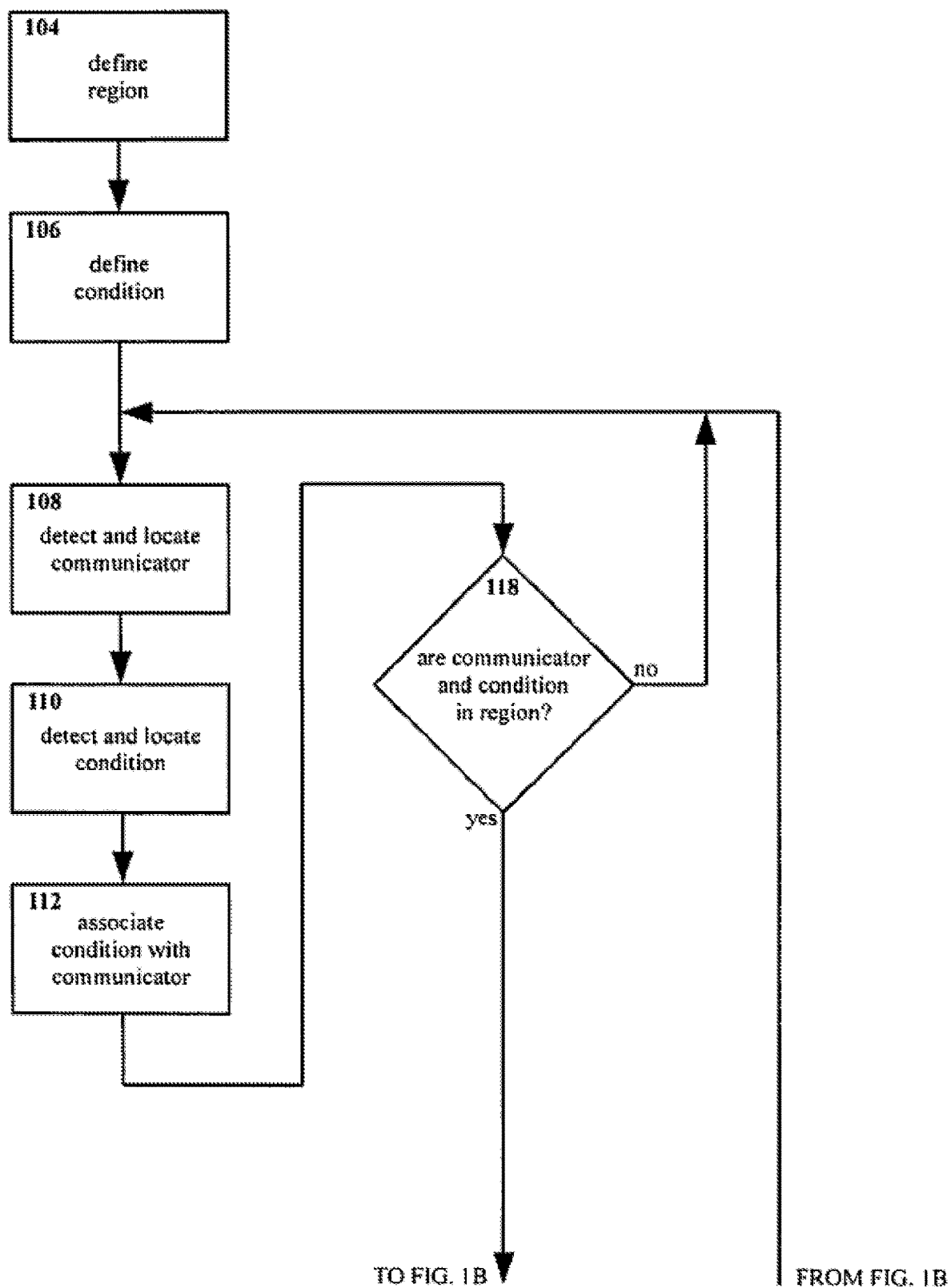
FIG. 1A and FIG. 1B shows an example embodiment of a method for obtaining opt-in compliance with regulations, in accordance with the disclosed technique.
Figure 1B:
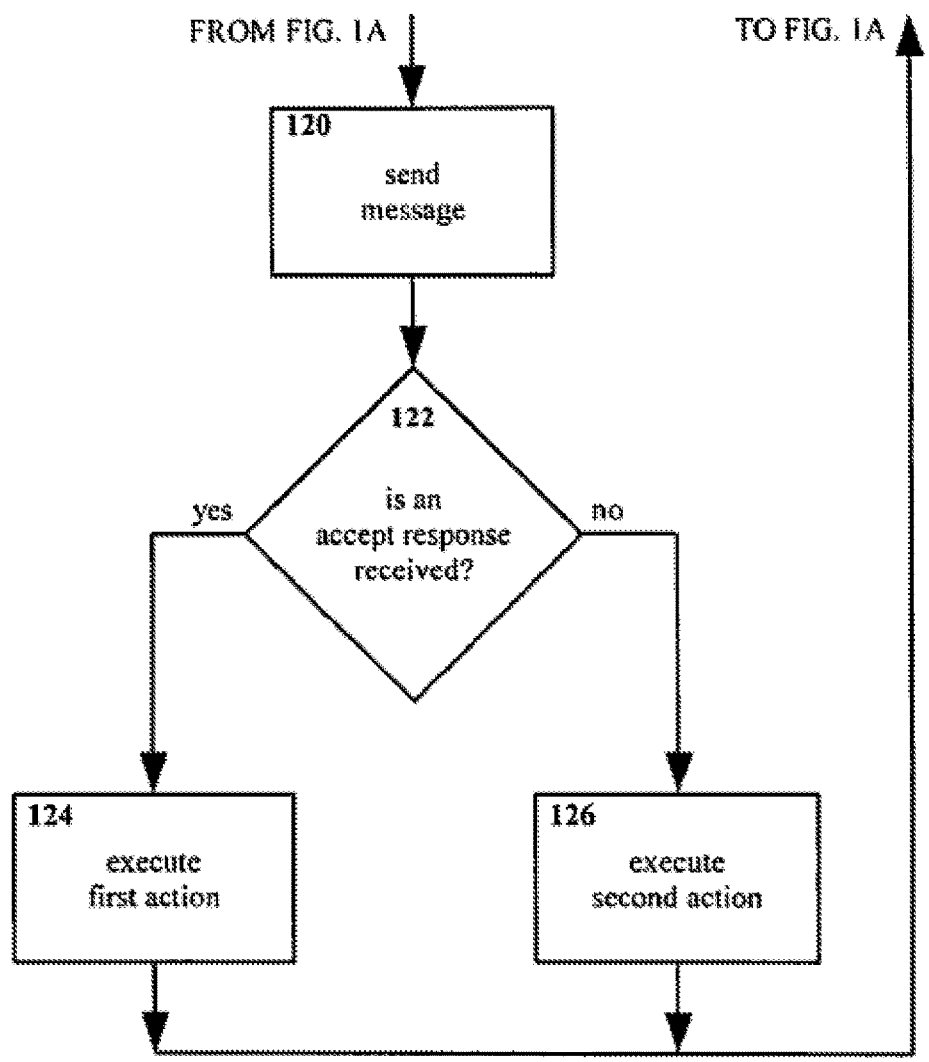

Referring to FIG. 1A and FIG. 1B, a method of obtaining opt-in compliance with regulations is shown therein.

Beginning with FIG. 1A, in the example method shown therein a region is defined 104. The region defined may be an area of physical space, for example the interior of a building such as a theater or restaurant, the cabin of an aircraft, a portion of a street or other public space, etc. The region may be three dimensional, such as a volume occupied by a room or rooms on a single floor of a building. However, the region may also be substantially two dimensional, for example having a defined "footprint" but no specifically defined maximum or minimum height. Other arrangements may be equally suitable; the disclosed technique is not particularly limited with regard to the details of the defined region.

It may not be necessary for the regions to have sharp or absolute boundaries, or fixed boundaries. Uncertainty in the position of boundaries for a region, "fuzziness" in terms of whether, along the boundaries, a particular location is inside or outside of the region, and/or variation in position of boundaries of a region over time may be permissible for at least certain embodiments.

The method also includes defining a condition 106. Typically, although not necessarily, the condition will be a capability of a portable electronic communications device. For example, the condition might be a capability for recording video. That is, the condition would be met by (for example) the presence of a portable electronic device capable of recording video. Other possible conditions include, but are not limited to, a capability for recording still images, a capability for recording audio, a capability for outputting audio, a capability for sending and/or receiving text messages, a capability for sending and/or receiving audio communications (e.g. telephone conversations), and a capability for making and/or utilizing remote data connections (e.g. internet service). However, these conditions are examples only, and other conditions may be equally suitable.

Typically, such conditions will be associated with regulations that are applicable within the defined region. That is, a region defined within a movie theater might have a regulation prohibiting audible cell phone ring tones, and the condition may be defined 106 as a capability to emit audible ring tones. It is noted that although certain examples presented herein refer specifically to prohibitions of certain actions, the disclosed technique is not limited only to regulations that constitute prohibitions.

Continuing with FIG. 1A, if a communicator is present, that communicator is detected and located 108.

The disclosed technique is not particularly limited as to the type of communicator that may be present. As the term "communicator" is used herein, a communicator is a device or system that enables communication between that device and some other communications device or system. Typically, though not necessarily, the communicator may be a portable electronic communication device such as a cell phone, pager, tablet, PDA, laptop computer, head mounted display, etc. However, other arrangements may be equally suitable.

Also, the disclosed technique is not particularly limited as to a manner by which the communicator is detected and located. It will be understood that approaches for detecting and locating a particular communicator will depend at least in part on the nature of the communicator, including but not limited to the manner by which that communicator communicates. For example, for a cell phone, detection and location might be accomplished by sensing radio signals from the cell phone so as to determine the presence of a cell phone, and by triangulating from two or more sensors to determine the location of the cell phone. However, this is an example only, and other arrangements, including but not limited to GPS, differential GPS, and optical identification, may be equally suitable.

Moreover, it is noted that the disclosed technique is not necessarily limited only to detecting communicators that are within the region. Detecting and/or locating communicators outside the region, while not required, is permissible.

Returning to FIG. 1A, if the condition defined in step 106 is present, the condition is detected and located 110.

As with detecting and locating the communicator, the disclosed technique is not particularly limited as to a manner by which the condition is detected and located. It will be understood that approaches for detecting and locating a particular condition will depend at least in part on the nature of the condition that is to be detected, as defined in step 106. For example, given an embodiment wherein the condition defined in step 106 is the capability for flash photography, flash cameras might be detected by using image sensors to detect the flash itself and the location of that flash. Alternately, image sensors might be used in combination with object recognition algorithms so as to visually identify the presence and location of a photograph flash unit whether or not the flash is used. As yet another approach, for certain conditions it may be possible to query the source of the condition itself, e.g. transmitting a query to a head mounted display as to whether that display has video recording capability, and if so whether that video recording capability is currently on.

It is noted that the disclosed technique is not necessarily limited only to detecting defined conditions that are within the region. Detecting and/or locating defined conditions outside the region, while not required, is permissible.

In addition, it is noted that for some embodiments, the condition may be integral to a particular communicator. For example, if the condition defined in step 106 is the capability to generate audible cell phone ring tones (as might be of concern for example in a movie theater), then the communicator and the condition—that is, a cell phone and the cell phone's ability to generate audible ring tones—may be linked such that in detecting and locating the communicator in step 108, the condition likewise is detected and located 110. Thus, for certain embodiments step 110 may be combined with step 108, and/or detecting and locating a communicator 108 may use similar or even identical approaches to detecting and locating the condition 110 itself.

However, such integral linking of the communicator with the condition may not exist for all embodiments. To return to the example of flash photography, assuming the flash camera is not itself a communicator, then detecting and locating communicator(s) 108 present within the region might then be distinct from detecting and locating instances of the condition 106 present within the region.

Furthermore, it is noted that determining a location of a communicator and/or a condition does not necessarily imply determining location in the form of a precise set of physical coordinates, or otherwise identifying a specific location in space. Rather, two factors are sufficient to determine location for the purposes of the disclosed technique.

First, whether a communicator and/or a condition is inside the region. As previously noted, some uncertainty and/or variability in the boundaries of the region is not excluded. Thus, some degree of uncertainty or variability in such determinations, at least near the boundaries of the region, may also exist, and is not precluded from the disclosed technique. Regardless of whether a determination is perfect or absolute, it must be possible to obtain some determination as to whether a communicator and/or a condition is within the region or not.

Second, whether a communicator can be located sufficiently as to send a message thereto. For this purpose, it may not be necessary to determine a physical location of the communicator at all, so long as some other arrangement—for example, determining the cell phone number, identifying communication protocols, even merely determining an appropriate frequency for wireless communication, may be sufficient. While determining a location in space for the communicator is not excluded, determining precise locations is not required, and determining location at all may not be required for some embodiments.

Again with regard to FIG. 1A, the condition is associated with the communicator 112. To continue the example of flash photography above, if a communicator such as a cell phone is detected and located in step 108, and a flash photograph or a flash capable camera is detected and located in step 110, then an association (if any) between the cell phone and the flash camera is to be determined. That is, the flash camera (condition) carried by a user thereof is associated 112 with the cell phone (communicator) carried by that user.

Typically, although not necessarily, it may be determined that a condition and a communicator are associated by determining the relative position thereof. If, for example, a flash camera is located at substantially the same position as a cell phone, or is some relatively short distance away (e.g. a few tens of centimeters), then for some embodiments it may be concluded that the camera and the cell phone are associated, presumably being carried by the same person.

However, other arrangements may be equally suitable. For example, visual detection and location of the communicator and/or the condition may reveal whether the communicator and the condition are associated.

In addition, it is possible, at least for some embodiments, that a communicator and a condition may not be associated. That is, a condition may exist at a certain location without a communicator being present at that location, and/or a communicator may exist at a certain location without the defined condition being present at that location. In such instance, step 112 may not take place, as there would be no association to be made.

Moving on in FIG. 1A, a determination is made as to whether the communicator and condition are present within the region 118. As noted, one or both of a communicator and a condition may be present, and may be present within a region, but unless both communicator and condition are present within the region and communicator and condition are associated with one another, the outcome of step 118 is no. If the outcome of the determination 118 is no, then the method returns to step 108. That is, if a communicator and associated condition are not found within the region, the method continues to search for associations of a communicator and the defined condition within the region.

Turning to FIG. 1B, if the outcome of the determination 118 is yes, a message is sent 120 to the communicator. The message includes a request for a response therein.

Typically, though not necessarily, the message will include content that announces a regulation relevant to the particular embodiment. For example, if video recording is prohibited within a given region, and the condition is defined 106 as a capability for video recording, the message might include a statement to the effect that video recording is prohibited within the region.

In addition, as noted above, the message includes a request for a response, typically a yes/no request for compliance with the regulation, and/or a yes/no request for acceptance of a temporary deactivation of the condition in question while in the region. To continue with the example, the message might include an "opt-in" query asking whether the communicator and/or the user will accept a temporary deactivation of video recording capabilities while in the region.

Typically, the message will be addressed to a user of a device. For example, a text message might be delivered to a cell phone, with a query to the user asking whether he or she will opt-in to deactivation of cell service, audible ring tones, etc. while in the region. However, for some embodiments it may be equally suitable if the message is addressed instead to an operating system or other set of executable instructions operating on a device, in addition to or in place of contacting the user directly. That is, a user might authorize the operating system of a device to automatically accept such messages, to automatically accept such messages under certain conditions (e.g. always when on commercial aircraft, or always when inside a particular business), etc.

Moving on in FIG. 1B, a determination is then made 122 as to whether a response accepting the message content is received or not. That is, for an arrangement wherein the message asked a user to opt-in to a deactivation of (for example) video recording, whether the user accepted to the deactivation of video recording capability.

Receipt of a positive, opt-in response is of substance for step 122. Embodiments of the disclosed technique may or may not distinguish between cases wherein a response is received rejecting the message content, and cases wherein no response is received or a response is received but not understood.

If an opt-in response is determined to have been received in step 122, a first action is executed 124. Typically, though not necessarily, the first action will include removing or deactivating the defined condition. For example, if the defined condition is a capability for video recording, the first action may include remote deactivation of the video recording capability.

The disclosed technique is not particularly limited as to the manner in which the condition is removed or deactivated. It will be understood that the manner for removing or deactivating the defined condition will depend to at least some extent on the particulars of the defined condition.

As previously described, the condition and the communicator may be linked in some instances. For example, the communicator might be a cell phone or head mounted display, with the condition being the video recording capability of the cell phone or head mounted display. In such instances, the condition may be removed or deactivated by addressing the communicator. For example, the first action may be executed by sending executable instructions to the cell phone, head mounted display, etc. that has the capability for recording video to shut down that video recording capability.

However, other arrangements may be equally suitable.

Typically, such removal or deactivation of the condition is temporary, being maintained only so long as the user, device, etc. is present within the region. To continue the example above, when the user, device, etc. is determined to have left the region, additional executable instructions may for example be sent to the cell phone, head mounted display, etc. to reactivate the video recording capability thereof.

Note that deactivation of a capability does not necessarily imply complete deactivation of a device possessing that capability, or deactivation of related capabilities. For example, a cell phone might be instructed to shut off audible ring tones, but still permit sending and receiving calls, text messages, etc. As another example, a tablet might have the capability to send or receive communications deactivated, while the ability to play video and music, run stored programs, etc. is unaffected. In addition, deactivation of a capability need not be absolute. For example, an instruction might be sent to a cell phone to generally prohibit making outgoing calls while in the region, but to still permit emergency services calls such as 9-1-1 to be made.

The first action is not limited only to deactivation or removal of the condition. For example, the first action might include an additional message confirming shut-down of the capability, thanking the user for complying with the regulation, etc.

Other actions might include logging a record of the user's opt-in. For example, if a user violates a regulation that they had previously accepted, and for which a record of the user's opt-in is logged, argument as to whether the user was aware of the regulation may be avoided.

In particular, logging may be useful for instances when removing or deactivating the condition is impossible or otherwise undesirable. For example, in a region where flash photography is prohibited, remote deactivation of the flash unit on a camera may not be possible unless the camera has remote communication capabilities. Nevertheless, the disclosed technique may be used to obtain opt-in acceptance from users of a policy prohibiting flash photography, with the user's acceptance then being logged.

In addition, in instances wherein removal or deactivation of the condition is impractical or impossible, logging may also serve as a source of information for other enforcement efforts. To continue the example above, a staff member in the region wherein flash photography is prohibited might be advised as to the presence and location of an individual with an active flash camera, so as to better monitor the individual and prevent the use of the flash.

Returning to the determination of acceptance in step 122, if a response accepting the message is not received, a second action is executed 126.

Typically, though not necessarily, the second action will include generating a notification that a communicator and the defined condition are associated together and are present within the region, and that an acceptance of compliance with the relevant regulation has not been received. For example, if the defined condition is a capability for video recording, the second action may include generation of a notification that a capability for video recording existing in the region, the location of that capability and/or the location of the associated communicator (if the two locations are different), and information that remote deactivation of the video recording capability was refused (or at least that acceptance of deactivation was not received).

Another option for the second action, in addition to or in place of generating a notification, might be to send an additional message to the communicator (and thus to a user thereof) that they are in violation of local regulations, and requesting that they either comply or exit. Alternately, a message might also include information regarding how to obtain an exception. For example, while the operators of a restaurant might prefer to prohibit cell phone calls and text messaging, the operators might consider permitting physicians to retain the ability to connect for phone and text communication in the event of an emergency.

Yet another option for the second action is to output the notification to a recipient, such as a video screen, either fixed (e.g. the monitor of a PC) or portable (e.g. a tablet or cell phone screen). Other display outputs might include audio signals, vibrations (i.e. for a pager or cell phone), indicator lights, text messages, etc. By displaying the information, staff or other persons present within the region can be readily made aware of the presence and location of a potential or actual violation of the regulation behind the defined condition. For example, on an aircraft in flight the crew could be made aware that an electronic communication device is in operation on board. The notification may also be communicated to other systems, recorded in a data store, etc.

These are examples only, and other arrangements may also be equally suitable.

Once the first action has been executed 124 or the second action has been executed 126 for a particular communicator and condition, the method returns to step 108. That is, the method continues to search for associations of a communicator and the defined condition in the region.

Typically, though not necessarily, the method may not repeat with respect to an individual communicator and condition. That is, once a response to the message has been obtained with opt-in to the regulation, additional messages requesting opt-in may not be necessary (i.e. so as not to "spam" users or devices unnecessarily). Typically, though again not necessarily, an opt-in request message will be sent when the communicator and condition are first sensed within the region, i.e. when a user first enters the region or when the user first exhibits the condition in question. However, repeating opt-in request messages, and/or sending other messages, also is not excluded, nor is a delay in sending an opt-in request message excluded.

For example, reminder messages might be sent periodically if the communicator subsequently remains within the region for some significant time. As a more concrete example, a user viewing a double feature in a theater might be reminded that their video recording capability is inactive after the first film is complete. Likewise, a user who attempts to reactive video recording capability while still within the region might also be reminded that video recording is prohibited therein. Alternately, if the region and/or condition are defined and/or imposed and/or changed with the user already present in the space occupied by the region, new opt-in request messages might be sent then.

As noted, other messages also may be sent. In particular, an additional third message might be sent when the communicator is no longer within the region. For example, a third message might indicate that the user may now reactivate video recording capability, that their video recording capability has been reactivated (presumably combined with actual reactivation of video recording capability), etc.

As may be seen from the example embodiment of a method according to the disclosed technique shown in FIG. 1A and FIG. 1B, the disclosed technique provides an arrangement for individually contacting users within a defined region, and obtaining consent from those users to comply with regulations such as prohibition of cell use, prohibition of video recording, etc. If established as an embodiment that facilitates automatic use, for example utilizing an electronic data processor capable of following executable instructions to scan a defined region for a communicator associated with a defined condition, such an embodiment of the disclosed technique may support automatically obtaining compliance from all persons with a communicator and meeting the defined condition within the region. Thus, such an embodiment could support individual attention to each person within the region, to support compliance by each such individual.

With regard to FIG. 1A and FIG. 1B, the embodiment described therein utilizes a single region. However, other arrangements may be equally suitable. For example, different regulations might be applied to different regions, even within a single store, building, park, etc. Thus, for some embodiments it may be useful to define multiple regions, each region having its own condition or conditions defined therefor.

In addition, for certain embodiments it may be useful to define multiple regions addressing the same regulation. For example, an outer first region might be defined for advising persons therein of regulations that are in place nearby, with an inner second region defined for obtaining opt-in compliance with those same regulations. A method for a two-region system along such lines is shown in FIG. 2A and FIG. 2B.

Figure 2A:
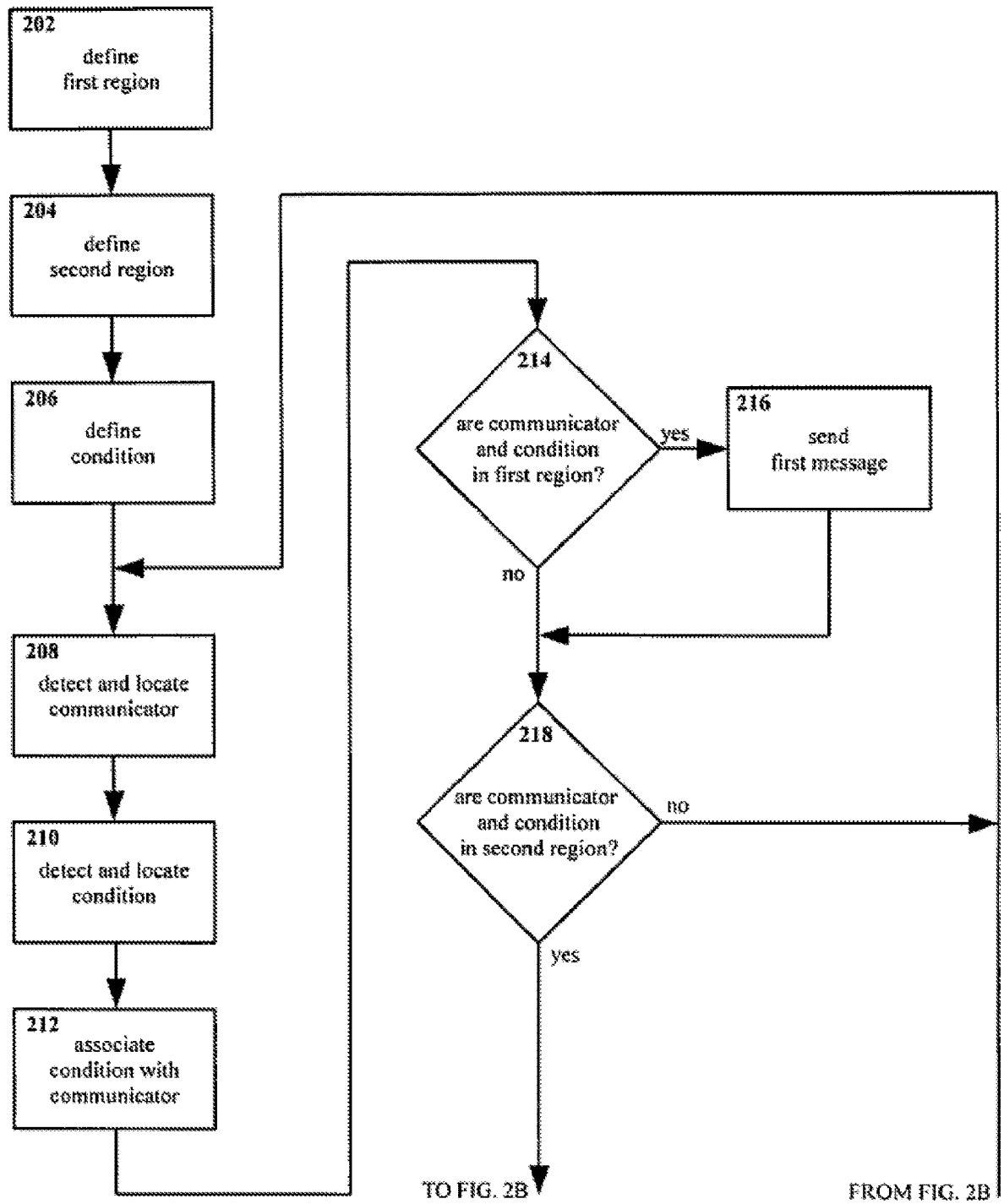
FIG. 2A and FIG. 2B shows another example embodiment of a method for obtaining opt-in compliance with regulations, in accordance with the disclosed technique.
Figure 2B:
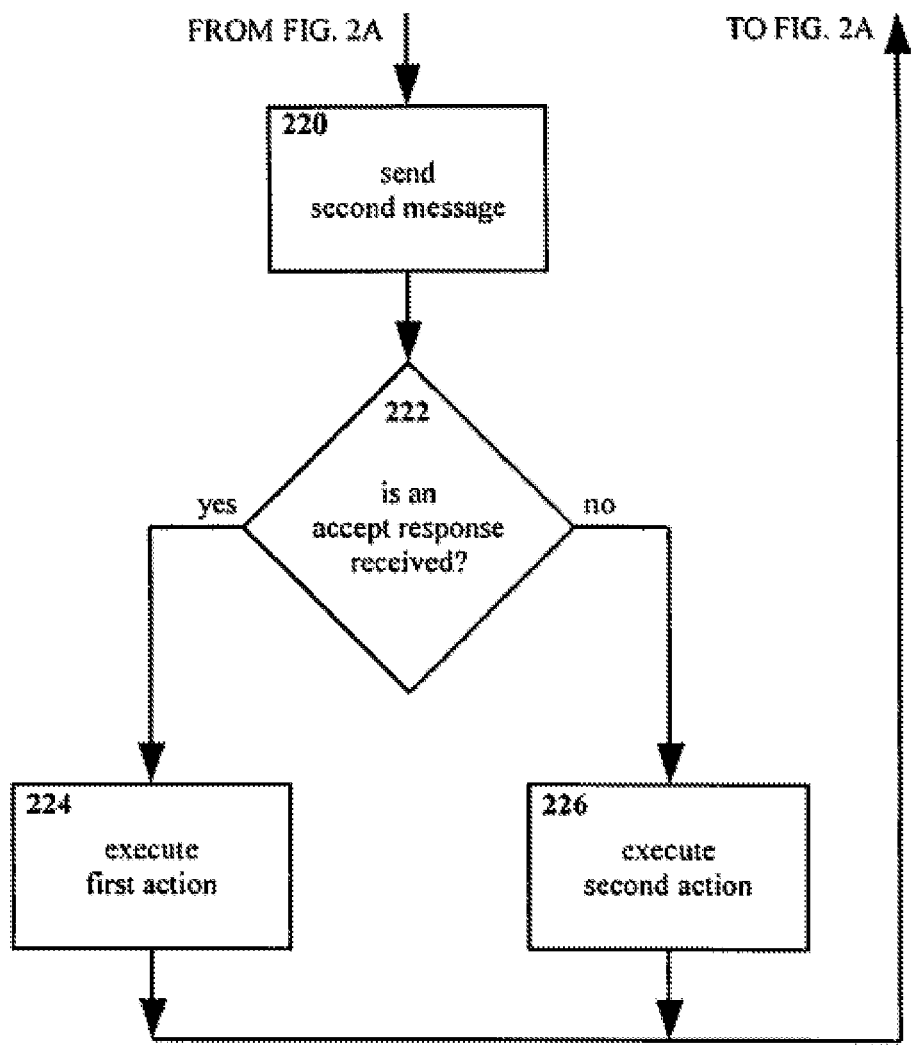

With reference to FIG. 2A, a first region is defined 202. For convenient this first region may also be referred to as an outer region, though this does not necessarily imply a particular geometry.

A second region is also defined 204. Again, for convenience this second region may be referred to as an inner region, though again this does not necessarily imply a particular geometry.

A condition is defined 206, the condition being defined as applicable to a regulation imposed within the first and/or second regions. Typically, though not necessarily, the condition will be defined for a regulation that is mandatory within the inner second region, and that is optional or does not apply within the outer first region (but that may be noteworthy as an advisory, for example due to proximity with the inner second region).

If communicators are present, the communicators are detected and located 208. If the condition is present, the condition also is detected and located 210. If necessary, the condition is associated with any communicators 212 that were detected in step 208.

Continuing in FIG. 2A, a determination is made 214 as to whether a communicator and the condition are present within the first (outer) region. If the outcome of the determination is yes, that is, a communicator and the condition are both present in the first region and are associated with one another, then a first message is sent 216 to the communicator.

Typically, though not necessarily, the first message will include content that announces a regulation relevant to the particular embodiment, and/or that includes information regarding where the regulation applies. For example, if video recording is prohibited within the second (inner) region, and the condition is defined 206 as a capability for video recording, the first message might include a statement to the effect that video recording is prohibited in a nearby area. The first message might define and/or describe the area, and or may include additional information, such as where to go or who to contact to request an exception, a description of consequences of violation of the regulation, an explanation of the reasoning behind the regulation, etc.

The first message does not necessarily require a response, though a first message that requests or requires a response also is not prohibited.

Referring again to step 214, it is noted that for the outcome to be yes, both a communicator and the condition must be present and associated with one another. In practice, instances may occur of either a communicator or a condition being present but not both, or a communicator and a condition both being present but not being associated (i.e. a communicator might be on one person, while another person some distance away might be fulfilling the condition). Unless both communicator and condition are present within the region and communicator and condition are associated with one another, the outcome of step 214 is no.

If the outcome of step 214 is no, the method proceeds to step 218.

In step 218, a determination is made as to whether the communicator and condition are present within the second (outer) region 218. Unless both communicator and condition are present within the region and communicator and condition are associated with one another, the outcome of step 218 is no. If the outcome of the determination 218 is no, then the method returns to step 208. That is, if a communicator and associated condition are not found within the second region (and having not been found in the first region in step 214), the method continues to search for associations of a communicator and the defined condition in the first and second regions.

Typically, though not necessarily, the method may not repeat individual first and second messages with respect to an individual communicator and condition. That is, once a first message has been sent, additional first messages may not be necessary. Likewise, once a response to the second message has been obtained with opt-in to the regulation, additional second messages requesting opt-in also may not be necessary.

Typically, though again not necessarily, a first message will be sent when the communicator and condition are initially sensed within the first region, i.e. when a user enters the first region or when the user initially exhibits the condition in question. Likewise, typically although not necessarily an opt-in request second message will be sent when the communicator and condition are initially sensed within the second region, i.e. when a user enters the second region or when the user initially exhibits the condition in question. However, repeating first messages, repeating opt-in request second messages, and/or sending other messages, also is not excluded, nor is a delay in sending first or second messages excluded.

Turning to FIG. 2B, if the outcome of the determination in step 218 is yes, a second message is sent 220 to the communicator. The second message includes a request for a response therein.

A determination is then made 222 as to whether a response accepting the second message content is received or not. That is, for an arrangement wherein the message asked a user to opt-in to a deactivation of (for example) video recording, did the user respond that deactivation of video recording capability is accepted, or not?

If an opt-in response is determined to have been received in step 222, a first action is executed 224. Typically, though not necessarily, the first action will include removing or deactivating the defined condition. For example, if the defined condition is a capability for video recording, the first action may include remote deactivation of the video recording capability.

If a response accepting the message is determined in step 222 not to have been received, a second action is executed 126. Typically, though not necessarily, the second action will include generating a notification that a communicator and the defined condition are associated together and are present within the second region, and that an acceptance of compliance with the relevant regulation has not been received. For example, if the defined condition is a capability for video recording, the second action may include generation of a notification that a capability for video recording existing in the second region, the location of that capability and/or the location of the associated communicator (if the two locations are different), and information that remote deactivation of the video recording capability was refused (or at least that acceptance of deactivation was not received).

Once the first action has been executed 224 or the second action has been executed 226 for a particular communicator and condition, the method returns to step 208. That is, the method continues to search for associations of a communicator and the defined condition in the first and second regions.

Figure 3:
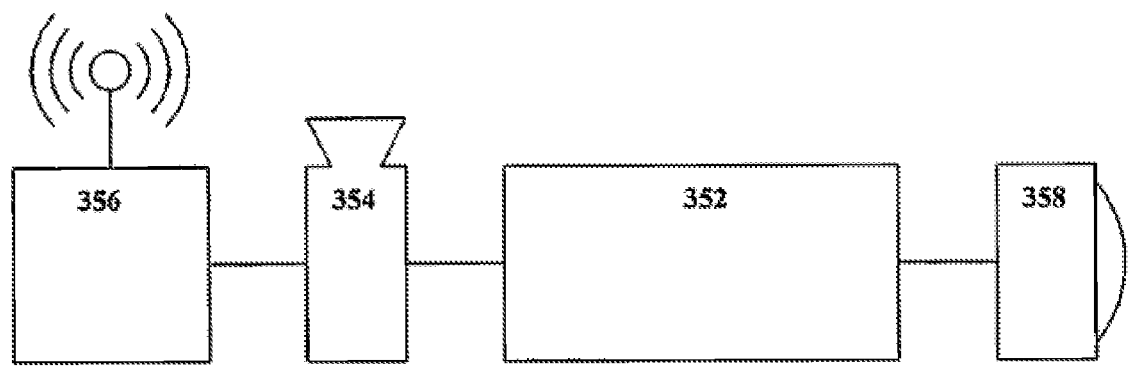
FIG. 3 shows a schematic arrangement of an apparatus in accordance with the disclosed technique.

Turning to FIG. 3, a schematic arrangement is shown therein for an example embodiment of an apparatus according to the disclosed technique.

The embodiment illustrated in FIG. 3 includes a processor 352, a sensor 354 in communication with the processor 352, and a first communicator 356 in communication with the processor 352.

The processor 352 is adapted to define a region, and to define a condition for the region. The sensor 354 is adapted to detect a presence and a location of a second communicator (not shown in FIG. 3), and to detect a presence and a location of a condition. (Keeping in mind previous comments made with regard to possible uncertainty in precise location.) The processor 352 is further adapted to associate the condition with the second communicator.

The first communicator 356 is adapted to send a message to the second communicator, the message including a request for a response to said message. The first communicator 356 is also adapted to receive a response from the second communicator.

In addition, the processor 352 is adapted to execute a first action if an acceptance response to the message is received, and to execute a second action if an acceptance response is not received.

A range of general-purpose, special-purpose, and embedded systems may be suitable for use as the processor 352. Moreover, it may be equally suitable for the processor 352 to consist of two or more physical or logical processor components.

A range of devices also may be suitable for use as the sensor 354. As illustrated in FIG. 3, the sensor 354 is shown with an outline of a compact digital camera, adapted to capture images and/or video. Use of cameras, including but not limited to CMOS and CCD cameras, may be suitable for certain embodiments. However, other sensors, including but not limited to radio-based sensors adapted to detect signals from wireless communication devices such as cell phones, tablets, head mounted displays, etc., may also be equally suitable. In addition, for certain embodiments a sensor 354 may not necessarily be a physical sensing device. For example, software and/or hardware adapted to transmit and receive queries and/or other information from one wireless device to another, may be adequate to identify and/or locate second communicators and their capabilities (i.e. whether those capabilities meet the defined condition) by "asking" the second communicators about the second communicators' function, capability, location, etc.

Similarly, a range of devices may be suitable for use as first communicators 356. As illustrated, the first communicator 356 in FIG. 3 is a wireless communicator adapted to utilize radio waves for communicating with cell phones, tablets, head mounted displays, etc., but this is an example only, and other arrangements may be equally suitable.

It is noted that while the first communicator 356 is an element of the apparatus according to the disclosed technique shown in FIG. 3, second communicators—not shown and not numbered in FIG. 3, but referred to herein—are not part of the disclosed technique. Rather, second communicators are communicators that are to be detected and located within the defined region.

The example embodiment in FIG. 3 also includes a recipient 358. A recipient 358 is an optional element, and may not be present in all embodiments. A recipient 358 functions to receive information from the processor 352, sensor 354, and/or first communicator 356; the recipient 358 may also perform some additional function with such information, such as displaying the information in a visible or audible form, recording the information in a data store, etc. The recipient 358, if present, may take various forms depending on the embodiment. For example, as shown in FIG. 3 the recipient 358 may be a display screen, but other arrangements, including but not limited to an audio speaker, a hard drive or other data storage system, etc. may be equally suitable.

The manner by which the processor 352 is in communication with the sensor 354, the first communicator 356, and (if present) the recipient 358 is not particularly limited. As illustrated in FIG. 3, components are shown to communicate by wire link, but other arrangements, including but not limited to wireless communication, may be equally suitable. Likewise, although the processor 352, sensor 354, first communicator 356, and (if present) recipient 358 are shown grouped together in FIG. 3, individual elements of the apparatus may be separated from one another in other embodiments.

Figure 4:
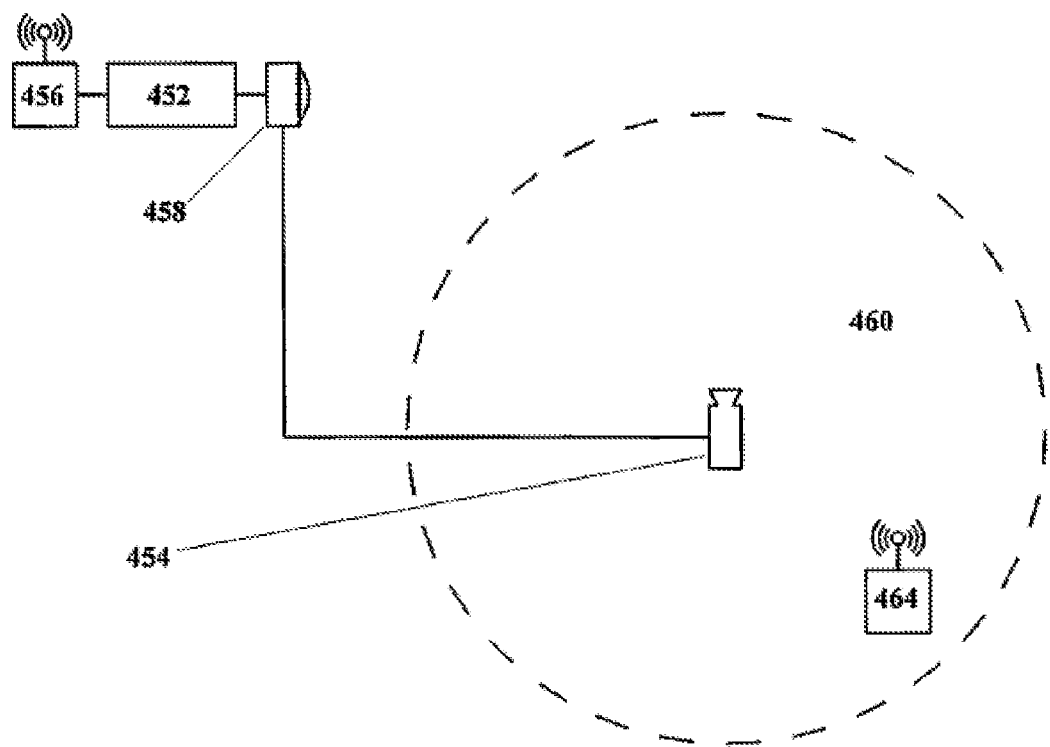
FIG. 4 shows an example arrangement an apparatus in accordance with the disclosed technique.

Turning to FIG. 4, therein is shown an example embodiment of the disclosed technique in use. In the embodiment of FIG. 4, the apparatus includes a processor 452, a sensor 454, a first communicator 456, and a recipient 458. As noted previously, the elements of the apparatus may be separated; as shown in FIG. 4, the sensor 454 is a significant distance from the processor 452, first communicator 456, and recipient 458.

A region 460 is defined by the apparatus. As shown in FIG. 4 the region 460 is a circle of space though in other embodiments the shape, size, arrangement, etc. of the region 460 may vary. In addition, as shown in FIG. 4, the sensor 454 is disposed so as to be substantially centered within the region 460. However, this is an example only, and the sensor 454 may be disposed elsewhere with respect to the region 460, including but not limited to be disposed outside the region 460.

FIG. 4 also shows a second communicator 464, the second communicator 464 being disposed within the region 460. As noted previously, the second communicator 464 is not necessarily part of the apparatus; the second communicator 464 is shown here for clarity, as the disclosed technique functions in part to detect and locate second communicators 464, e.g. within a defined region 460.

As also noted, the disclosed technique also detects and locates a defined condition, e.g. within a defined region. Unless otherwise specified herein, with respect to FIG. 4 (and subsequent FIG. 5) it should be understood that for purposes of explanation the second communicator 464 is assumed to also satisfy the defined condition, e.g. the second communicator 464 has video recording capability, etc.

Thus, in operation the apparatus would detect and locate the second communicator 464, would detect and locate the condition as associated with the second communicator 464, and would send a message to the second communicator 464 as previously described with regard to FIG. 1A and FIG. 1B, requesting opt-in (for example) to deactivate the video recording capability of the second communicator 464, as also described with regard to FIG. 1A and FIG. 1B.

Figure 5:
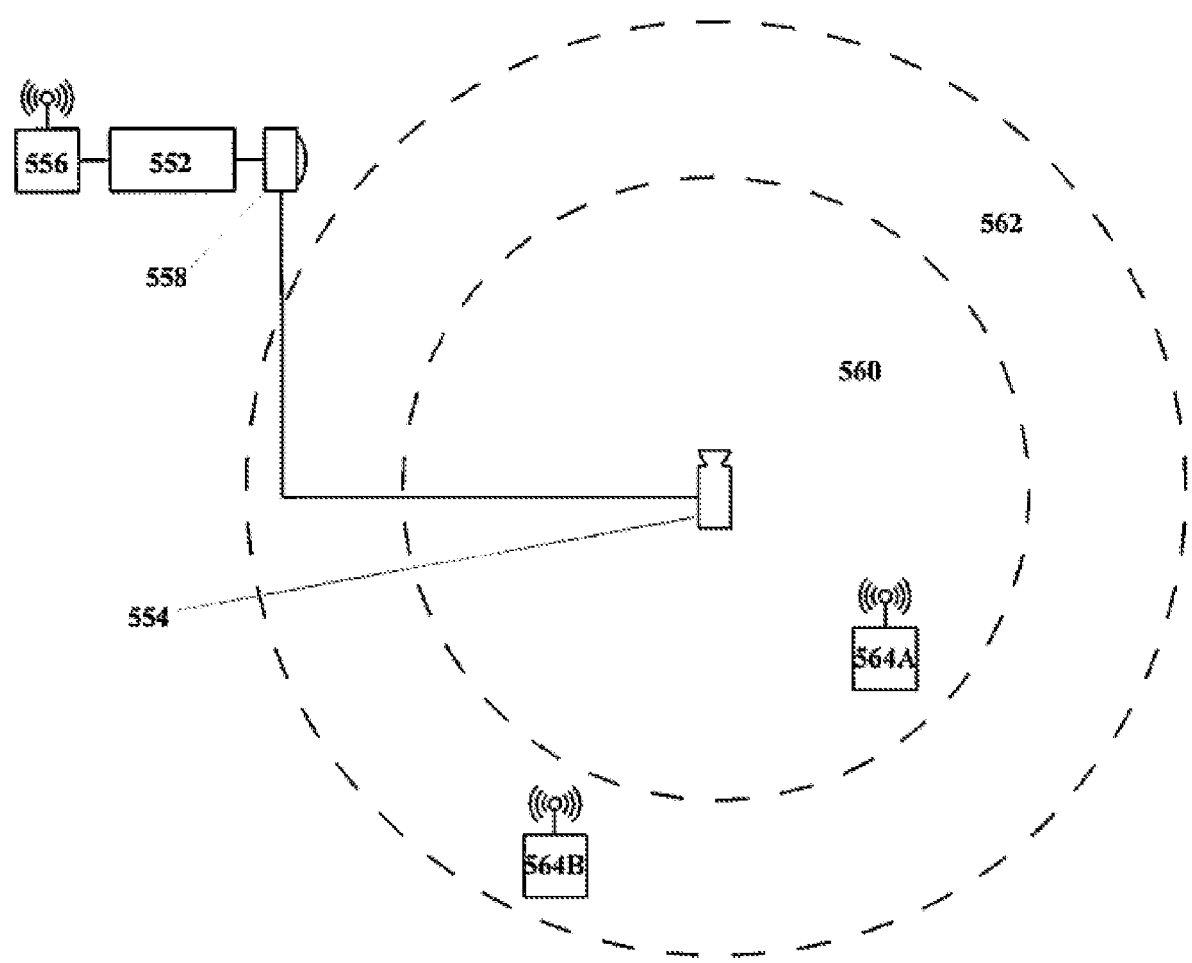
FIG. 5 shows another example arrangement an apparatus in accordance with the disclosed technique.

Referring now to FIG. 5, therein is shown another example embodiment of the disclosed technique in use. In the embodiment of FIG. 5, the apparatus includes a processor 552, a sensor 554, a first communicator 556, and a recipient 558.

In FIG. 5, a second (inner) region 560 is defined by the apparatus. In addition, a first (outer) region 562 also is defined. As illustrated the first and second regions 562 and 560 are concentric with the first region 562 fully enclosing the second region 560, but this is an example only and other arrangements may be equally suitable.

FIG. 5 also shows two second communicators 564A and 564B, with second communicator 564A being disposed within the first region 460 and second communicator 564B being disposed within the second region 462. The second communicators 564A and 564B are not necessarily part of the apparatus, but are shown here for clarity.

In operation the apparatus would detect and locate second communicator 564A within the second region, would detect and locate the condition as associated with second communicator 564A, and would send a second message to second communicator 564A as previously described with regard to FIG. 2A and FIG. 2B, requesting opt-in (for example) to deactivate the video recording capability of second communicator 564A, as also described with regard to FIG. 2A and FIG. 2B.

In addition, the apparatus would detect and locate second communicator 564B within the first region, would detect and locate the condition as associated with second communicator 564B, and would send a first message to second communicator 564B as previously described with regard to FIG. 2A and FIG. 2B.

Figure 6:
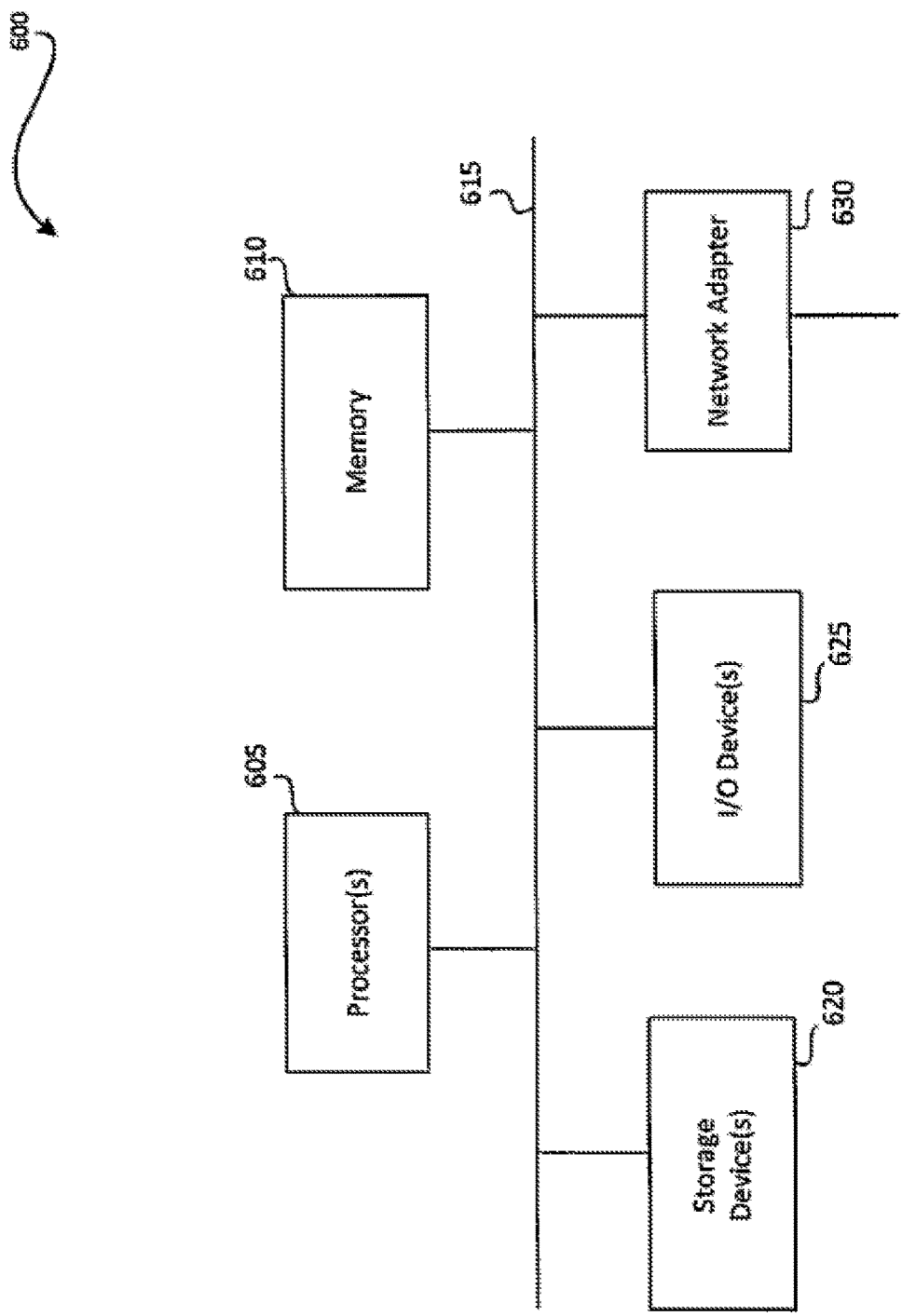
FIG. 6 is a block diagram of a processing system that can implement operations of the present disclosure.

FIG. 6 is a block diagram of an apparatus that may perform various operations, and store various information generated and/or used by such operations, according to an embodiment of the disclosed technique. The apparatus can represent any computer or processing system described herein. The processing system 600 is a hardware device on which any of the entities, components or services depicted in the examples of FIGS. 1-5 (and any other components described in this specification) can be implemented. The processing system 600 includes one or more processors 605 and memory 610 coupled to an interconnect 615. The interconnect 615 is shown in FIG. 6 as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 605 is/are the central processing unit (CPU) of the processing system 600 and, thus, control the overall operation of the processing system 600. In certain embodiments, the processor(s) 605 accomplish this by executing software or firmware stored in memory 610. The processor(s) 605 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 610 is or includes the main memory of the processing system 600. The memory 610 represents any form of random access memory (RAM), read-only memory (ROM), flash memory, or the like, or a combination of such devices. In use, the memory 610 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 605 through the interconnect 615 are a network adapter 630, a storage device(s) 620 and I/O device(s) 625. The network adapter 630 provides the processing system 600 with the ability to communicate with remote devices, over a network and may be, for example, an Ethernet adapter or Fibre Channel adapter. The network adapter 630 may also provide the processing system 600 with the ability to communicate with other computers within the cluster. In some embodiments, the processing system 600 may use more than one network adapter to deal with the communications within and outside of the cluster separately.

The I/O device(s) 625 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 610 can be implemented as software and/or firmware to program the processor(s) 605 to carry out actions described above. In certain embodiments, such software or firmware may be initially provided to the processing system 600 by downloading it from a remote system through the processing system 600 (e.g., via network adapter 630).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 620 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:

1. A method, comprising:
   detecting, by a first electronic device, a first presence of the first electronic device in a first geographic region;
   determining a capability of the first electronic device to perform a regulated activity that is regulated in a second geographic region that is adjacent to the first geographic region;
   receiving, from a second electronic device, a notification indicating that the regulated activity is restricted within the second geographic region, wherein the notification comprises a request for a user input indicating whether the first electronic device will deactivate the capability of the first electronic device while the first electronic device is in the second geographic region;
   in response to the user input indicating a user of the first electronic device agrees to deactivate the capability of the first electronic device while in the second geographic region, executing, by a processing device of the first electronic device, a first action associated with the notification to set the first device to deactivate the capability of the first electronic device when the first electronic device detects that the first electronic device is in the second geographic region; and
   in response to the user input indicating the user of the first electronic device does not agree to deactivate the capability of the first electronic device when the first electronic device detects that the first electronic device is in the second geographic region, executing, by the processing device, a second action associated with the notification to send a non-compliance notification to the second electronic device indicating an affirmative rejection of the request.

2. The method of claim 1, wherein the first electronic device comprises a mobile device.

3. The method of claim 1, wherein deactivating the capability comprises deactivating at least one of a camera, microphone, antenna, or application of the first electronic device.

4. The method of claim 1, wherein the notification comprises a prompt requesting the user input to confirm or reject the request to deactivate the capability of the first electronic device.

5. The method of claim 1, wherein the notification includes a request for a user input confirming that a user will desist from a behavior while in the second geographic region.

6. The method of claim 1, further comprising:
   automatically deactivating the capability of the first electronic in response to detection of the first electronic device in the second geographic region; and
   providing an alert communicating that the capability has been deactivated while in the second geographic region.

7. The method of claim 1, further comprising sending a non-compliance notification providing penalties corresponding to a failure to deactivate the capability.

8. A method, comprising:
   detecting, by a first electronic device, a presence of the first electronic device within a first geographic region separate from a second geographic region;
   determining a first capability of the first electronic device to perform a first regulated activity that is regulated for the first geographic region;
   determining a second capability of the first electronic device to perform a second regulated activity that is regulated for the second geographic region;
   receiving, at the first electronic device:
      a first notification indicating that the first regulated activity is restricted within the first geographic region, wherein the first notification comprises a first request for a first user input indicating whether the first electronic device will deactivate the first capability of the first electronic device while in the first geographic region; and
      a second notification indicating that the second regulated activity is restricted within the second geographic region, wherein the second notification comprises a second request for a second user input indicating whether the first electronic device will deactivate the second capability of the first electronic device while in the second geographic region;
   in response to the first user input indicating a user of the first electronic device agrees to deactivate the first capability of the first electronic device while in the first geographic region, setting the first electronic device to deactivate-the first capability of the first electronic device while the first electronic device is in the first geographic region; and
   in response to the first user input indicating the user does not agree to deactivate the first capability of the first electronic device while in the first geographic region, sending a first non-compliance notification to a second electronic device indicating an affirmative rejection of the first request, and maintaining the first capability of the first electronic device while the first electronic device is in the first geographic region;
   in response to the second user input accepting deactivation of the second capability of the first electronic device while in the second geographic region, setting the first electronic device to deactivate the second capability of the first electronic device when the first electronic device is in the second geographic region; and
   in response to the second user input rejecting deactivation of the second capability of the first electronic device when the first electronic device is in the second geographic region, sending a second non-compliance notification to the second electronic device indicating an affirmative rejection of the second request, and maintaining the second capability of the first electronic while the first electronic device is in the second geographic region.

9. The method of claim 8, wherein:
   the first notification cites an authority for restriction of the first capability for the first geographic region; and
   the second notification cites an authority for restriction of the second capability for the second geographic region.

10. The method of claim 8, further comprising receiving an alert that the first capability or the second capability is deactivated.

11. The method of claim 8, further comprising reactivating the first capability or the second capability a providing an alert that the first capability or the second capability is reactivated.

12. A device, comprising:
   a sensing device configured to detect a presence of a processing device in a first geographic region that is separate from a second geographic region; and
   the processing device communicatively coupled to the sensing device, the processing device configured to:
      determine a capability of the processing device to perform a regulated activity;

receive from an electronic device a notification indicating that the regulated activity of the processing device is restricted within the second geographic region, the notification requesting a user input, from a user, indicating whether the processing device will deactivate the capability when the sensing device detects the processing device is located in the second geographic region;

in response to the user input indicating a user agrees to deactivate the capability when the sensing device detects the processing device is in the second geographic region, deactivating the capability of the processing device when the sensing device detects the processing device is in the second geographic region and in response to the user input indicating the user does not agree to deactivate the capability when the sensing device detects the processing device is in the second geographic region, sending a non-compliance notification to the electronic device indicating an affirmative rejection of the request.

13. The device of claim 12, wherein the user input acknowledges the regulation restricting the regulated activity.

14. The device of claim 12, wherein the notification provides authority corresponding to the regulation.

15. The device of claim 12, wherein the capability comprises at least one of a camera, flash, microphone, speaker, vibration, connectivity, or communication capability.

16. The device of claim 12, wherein deactivation of the capability is time limited.

17. The device of claim 12, wherein the deactivation of the capability is a partial deactivation.

18. The device of claim 12, wherein the processing device is further configured to receive a message thanking the user in response to acceptance of the deactivation.

19. The device of claim 12, wherein the processing device is further configured to provide reminders of the deactivation of the capability until the processing device has left the second geographic region.

* * * * *